(12) United States Patent
Ramanujam

(10) Patent No.: US 9,436,433 B2
(45) Date of Patent: *Sep. 6, 2016

(54) METHOD, APPARATUS AND INSTRUCTIONS FOR PARALLEL DATA CONVERSIONS

(71) Applicant: Intel Corporation, Santa Clara, CA (US)

(72) Inventor: Gopalan Ramanujam, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/700,736

(22) Filed: Apr. 30, 2015

(65) Prior Publication Data

US 2015/0301801 A1     Oct. 22, 2015

Related U.S. Application Data

(63) Continuation of application No. 13/836,365, filed on Mar. 15, 2013, now Pat. No. 9,047,081, which is a continuation of application No. 13/683,012, filed on Nov. 21, 2012, now Pat. No. 9,026,570, which is a (Continued)

(51) Int. Cl.
*G06F 7/00*      (2006.01)
*G06F 7/48*      (2006.01)
*G06F 9/30*      (2006.01)

(52) U.S. Cl.
CPC ............. *G06F 7/48* (2013.01); *G06F 9/30014* (2013.01); *G06F 9/30025* (2013.01); *G06F 9/30032* (2013.01); *G06F 9/30036* (2013.01); *G06F 9/30109* (2013.01); *G06F 9/30145* (2013.01)

(58) Field of Classification Search
CPC .... H03M 7/24; G06F 9/30025; G06F 7/572; G06F 7/4876; G06F 7/491
USPC .......................................... 708/550–553, 204
See application file for complete search history.

(56) References Cited

U.S. PATENT DOCUMENTS 5,793,654 A    8/1998   Doshi et al.
5,819,101 A    10/1998  Peleg et al.

(Continued)

FOREIGN PATENT DOCUMENTS

WO    2005/026944 A2    3/2005
WO    2005/026944 A3    4/2006

OTHER PUBLICATIONS

Non-Final Office Action received for U.S. Appl. No. 10/658,612, mailed on Dec. 5, 2006, 6 pages.

(Continued)

*Primary Examiner* — Tan V. Mai
(74) *Attorney, Agent, or Firm* — Vecchia Patent Agent, LLC

(57) ABSTRACT

Method, apparatus, and program means for performing a conversion. In one embodiment, a disclosed apparatus includes a destination storage location corresponding to a first architectural register. A functional unit operates responsive to a control signal, to convert a first packed first format value selected from a set of packed first format values into a plurality of second format values. Each of the first format values has a plurality of sub elements having a first number of bits. The second format values have a greater number of bits. The functional unit stores the plurality of second format values into an architectural register.

3 Claims, 14 Drawing Sheets

Related U.S. Application Data continuation of application No. 12/986,924, filed on Jan. 7, 2011, now Pat. No. 8,533,244, which is a continuation of application No. 10/658,612, filed on Sep. 8, 2003, now Pat. No. 7,899,855.

(56) References Cited

U.S. PATENT DOCUMENTS

| | | | |
|---|---|---|---|
| 5,881,275 | A | 3/1999 | Peleg et al. |
| 5,959,636 | A | 9/1999 | Lin et al. |
| 5,959,874 | A | 9/1999 | Lin et al. |
| 6,247,116 | B1 | 6/2001 | Abdallah et al. |
| 6,263,426 | B1 | 7/2001 | Abdallah et al. |
| 6,266,769 | B1 | 7/2001 | Abdallah et al. |
| 6,282,554 | B1 | 8/2001 | Abdallah et al. |
| 6,292,815 | B1 | 9/2001 | Abdallah et al. |
| 6,405,306 | B2 | 6/2002 | Elliott et al. |
| 6,480,868 | B2 | 11/2002 | Abdallah et al. |
| 6,502,115 | B2 | 12/2002 | Abdallah et al. |
| 7,899,855 | B2 | 3/2011 | Ramanujam |
| 8,533,244 | B2 | 9/2013 | Ramanujam |
| 9,002,914 | B2 | 4/2015 | Ramanujam |
| 9,026,569 | B2 | 5/2015 | Ramanujam |
| 9,026,570 | B2 | 5/2015 | Ramanujam |
| 9,032,003 | B2 | 5/2015 | Ramanujam |
| 9,032,004 | B2 | 5/2015 | Ramanujam |
| 9,047,081 | B2 | 6/2015 | Ramanujam |
| 2001/0016902 | A1 | 8/2001 | Abdallah et al. |
| 2003/0065698 | A1 | 4/2003 | Ford |

OTHER PUBLICATIONS

Final Office Action received for U.S. Appl. No. 10/658,612, mailed on Apr. 12, 2007, 5 pages.
Notice of Allowance received for U.S. Appl. No. 10/658,612, mailed on Oct. 8, 2010, 4 pages.
Non-Final Office Action received for U.S. Appl. No. 12/986,924, mailed on Feb. 4, 2013, 4 pages.
Notice of Allowance received for U.S. Appl. No. 12/986,924, mailed on May 10, 2013, 6 pages.
Non-Final Office Action received for U.S. Appl. No. 13/625,073, mailed on Aug. 6, 2014, 8 pages.
Notice of Allowance received for U.S. Appl. No. 13/625,073, mailed on Jan. 8, 2015, 5 pages.
Non-Final Office Action received for U.S. Appl. No. 13/625,085, mailed on Aug. 6, 2014, 8 pages.
Notice of Allowance received for U.S. Appl. No. 13/625,085, mailed on Jan. 14, 2015, 5 pages.
Non-Final Office Action received for U.S. Appl. No. 13/682,993, mailed on Aug. 7, 2014, 8 pages.
Notice of Allowance received for U.S. Appl. No. 13/682,993, mailed on Jan. 9, 2015, 5 pages.
Non-Final Office Action received for U.S. Appl. No. 13/683,012, mailed on Aug. 6, 2014, 8 pages.
Notice of Allowance received for U.S. Appl. No. 13/683,012, mailed on Jan. 7, 2015, 5 pages.
Non-Final Office Action received for U.S. Appl. No. 13/843,339, mailed on Aug. 19, 2014, 6 pages.
Notice of Allowance received for U.S. Appl. No. 13/843,339, mailed on Dec. 5, 2014, 6 pages.
Non-Final Office Action received for U.S. Appl. No. 13/836,365, mailed on Aug. 19, 2014, 10 pages.
Notice of Allowance received for U.S. Appl. No. 13/836,365, mailed on Feb. 2, 2015, 5 pages.
Office Action received for Chinese Patent Application No. 200480025519.X, mailed on Apr. 20, 2007, 6 pages of English Translation and 3 pages of Chinese Office Action.
Office Action received for Chinese Patent Application No. 200480025519.X, mailed on Dec. 28, 2007, 3 pages of English Translation and 3 pages of Chinese Office Action.
Office Action received for German Patent Application No. 11 2004 001 648.7, mailed on Jul. 6, 2007, 4 pages of English Translation and 4 pages of German Office Action.
Office Action received for German Patent Application No. 11 2004 001 648.7, mailed on Aug. 1, 2008, 2 pages of English Translation and 3 pages of German Office Action.
International Search Report and Written Opinion received for PCT Patent Application No. PCT/US2004/027683, mailed on Feb. 23, 2006, 13 pages.
International Preliminary Report on Patentability and Written Opinion received for PCT Patent Application No. PCT/US2004/027683, mailed on Mar. 23, 2006, 10 pages.

METHOD, APPARATUS AND INSTRUCTIONS FOR PARALLEL DATA CONVERSIONS

RELATED APPLICATIONS

The present application is a continuation of U.S. patent application Ser. No. 13/836,365, filed on Mar. 15, 2013, entitled "METHOD, APPARATUS AND INSTRUCTIONS FOR PARALLEL DATA CONVERSIONS", which is a continuation of U.S. application Ser. No. 13/683,012, filed Nov. 21, 2012, entitled "METHOD, APPARATUS AND INSTRUCTIONS FOR PARALLEL DATA CONVERSIONS", which is a continuation of U.S. application Ser. No. 12/986,924, filed Jan. 7, 2011, entitled "METHOD, APPARATUS AND INSTRUCTIONS FOR PARALLEL DATA CONVERSIONS", now Patented as U.S. Pat. No. 8,533,244, Issued on Sep. 10, 2013, which is a continuation of U.S. application Ser. No. 10/658,612, filed Sep. 8, 2003, entitled "METHOD, APPARATUS AND INSTRUCTIONS FOR PARALLEL DATA CONVERSIONS", now Patented as U.S. Pat. No. 7,899,855, Issued on Mar. 1, 2011.

BACKGROUND

1. Field

The present disclosure pertains to the field of processing apparatuses and associated software and software sequences that perform mathematical operations.

2. Description of Related Art

Improving the performance of computer or other processing systems generally improves overall throughput and/or provides a better user experience. One area of concern is processing of image data. As computer and other processing systems handle larger amounts of video or image data, techniques to expedite such processing grow in importance.

Video data may be represented in the form of pixels. One example format for a pixel is the Red, Green, Blue (RGB) format. The number of bits used to represent a pixel may vary according to the particular system. For example, a twenty-four bit RGB representation may dedicate eight bits to each component. The RGBA format is another popular format that includes "alpha" information, a transparency indicator. An alpha channel number specifies the transparency of the particular pixel in a range from 0 (fully opaque) to 255 (completely transparent). Other formats may also be used such as the luminance (YUV) format or any other known or otherwise available format.

Processing of pixels may be performed in formats other than their pixel (e.g., integer) representation. For example, to perform some mathematical operations on pixel values, conversion to a floating point representation first may be desirable. Various high level languages (e.g., C, Java, etc.) may provide instructions can be used to convert a pixel value in an integer format to another type of format. These high level languages, however, by their nature are broken down into native instruction sequences and may not guaranty parallelism or efficiency in carrying out the conversion.

On the other hand, software sequences written in the native language of a processing device may be written to perform processing of such pixels. However such native language sequences are constrained by the instruction set of the processing device. If the processing device does not offer instructions to efficiently process values such as pixel values, then it may be difficult to construct an efficient software sequence. Some prior art processors include a variety of conversion instructions. For example, the Intel Pentium® 4 Processor includes convert instructions such as those detailed in the IA-32 Intel Architecture Software Developer's Manual: Vol. 2: Instruction Set Reference (document number 2454761). However, additional conversions may be useful under some conditions and for some applications such as conversion and processing of image data.

BRIEF DESCRIPTION OF THE FIGURES

The present invention is illustrated by way of example and not limitation in the Figures of the accompanying drawings.

DETAILED DESCRIPTION

The following description describes embodiments of techniques for parallel data conversions. In the following description, numerous specific details such as processor types, data types, data formats, register types, register arrangements, system configurations, and the like are set forth in order to provide a more thorough understanding of the present invention. It will be appreciated, however, by one skilled in the art that the invention may be practiced without such specific details. Additionally, some well known structures, circuits, and the like have not been shown in detail to avoid unnecessarily obscuring the present invention.

The present disclosure details various conversion and processing techniques that may be advantageous for some types of data in some environments. For example, image processing and particularly pixel processing may be expedited using disclosed techniques in some cases. In some such cases, an integer to floating point conversion may be used. In other cases, disclosed conversion techniques may be used to convert from a different first format (other than integer) to a second format (other than floating point) or vice versa. For example, redundant numeric format or different scientific, mathematical, or other encoded forms may be used for the source or destination format. Additionally, it is anticipated that disclosed conversion techniques may find applicability in a wide variety of signal processing scenarios and/or in many different processing environments.

Figure 1:
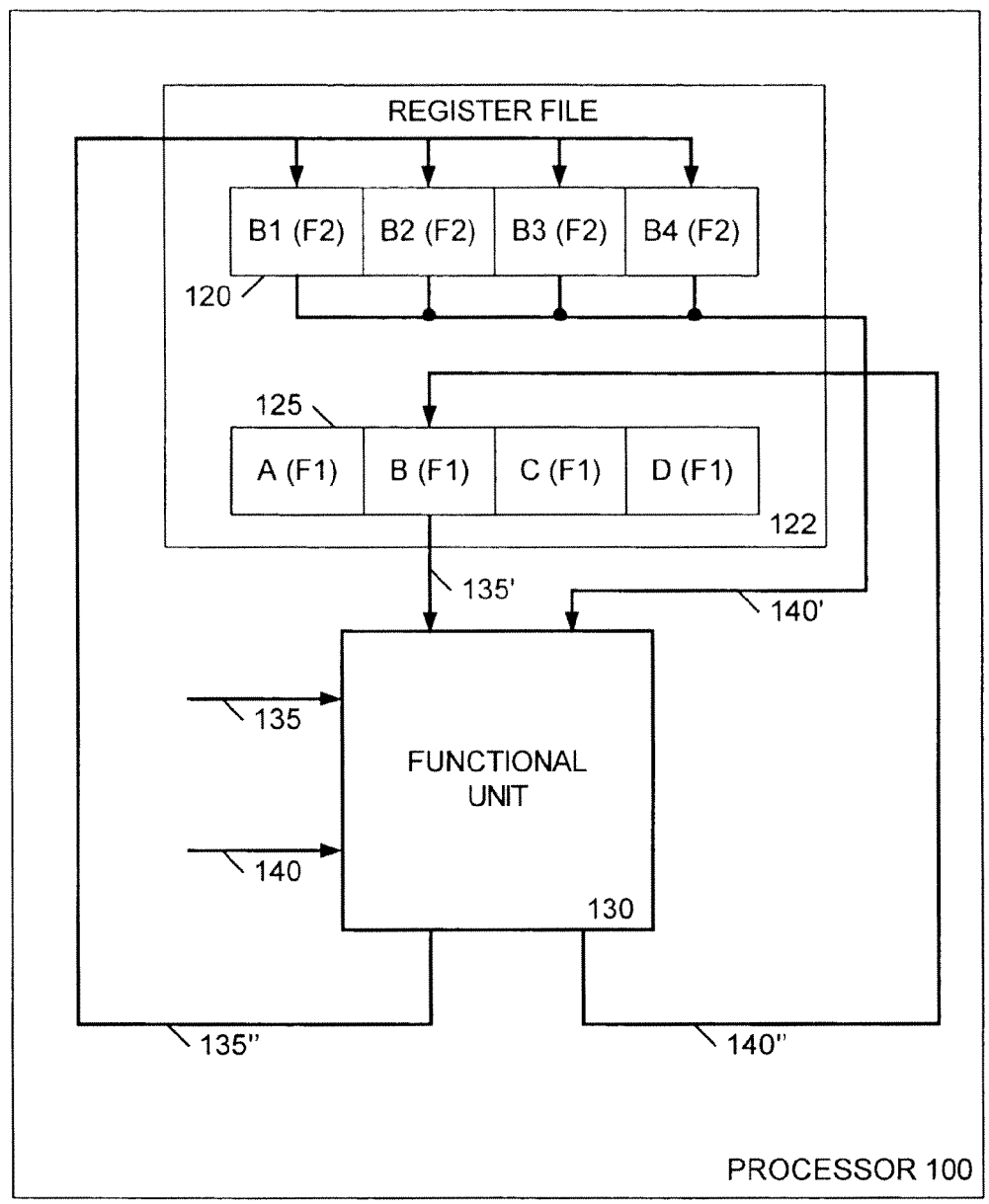
FIG. 1 illustrates one embodiment of a processor having a conversion capability.

FIG. 1 illustrates one embodiment of a processor 100 that performs conversions from a first format (F1) to a second format (F2) and vice versa. The processor may be any of a variety of different types of processors that execute instructions. For example, the processor may be a general purpose processor such as a processor in the Pentium® Processor Family or the Itanium® Processor Family or other processor families from Intel Corporation or other processors from other companies. Thus, the processor may be a reduced instruction set computing (RISC) processor, a complex instruction set computing (CISC) processor, a very long instruction word (VLIW) processor, or any hybrid or alternative processor type. Moreover, special purpose processors such as network or communication processors, co-processors, embedded processors, compression engines, graphics processors, etc., may use disclosed techniques.

In the embodiment of FIG. 1, a first register 120 and a second register 125 are provided as a portion of a register file 122. A single physical register may correspond to or effectively serve as an architectural register in embodiments that do not utilize register renaming techniques. In embodiments utilizing register renaming techniques, typically a different physical register may hold the value of an architectural register at different points in time. Therefore, various physical registers from a set of renamed registers may correspond to the architectural registers at different times, with the correspondence being tracked via register renaming circuitry.

In some embodiments, the first register 120 and the second register may be part of a single register set. A register set or a group of registers is a number of registers (may or may not be renamed) that are accessed in a similar manner by the instruction set. For example, a first register (r0) and a last register (r15) in a register set may be addressed in the same manner by just changing the register number in the operand specifier. In some microprocessor products from Intel Corporation (e.g., IA-32 microprocessors), register sets include integer registers (e.g,. EAX, EBX, etc.), MMX registers (mm1, mm2, etc.), XMM registers (xmm1, xmm2, etc.), and floating point registers.

The register set may be adapted to store packed data. A packed data is a data element that comprises at least two sub elements. A register set may be adapted to store packed data elements by permitting access to one or various ones of the sub elements of the register. At different times, a particular register in a register set may hold packed data elements of different sizes, and all of the different individual sizes of packed elements may or may not all be accessible individually. In the example of FIG. 1, the register set 122 is shown storing four packed data elements, each of which consumes one quarter of the total bits of the register.

The embodiment of FIG. 1 also includes a functional unit 130 that operates responsively to control signals. As will be further discussed below, the control signals may be composite signals comprising multiple bits or signal lines and/or may be micro operations or other outputs from circuitry such as a decoder, converter, translator, etc. As shown, the functional unit 130 may receive a control signal as indicated by arrow 135. In response to the control signal 135, the functional unit may access one of the four packed data elements of the register 125. The particular one of the data elements to be accessed may be specified by a portion of the control signal. In the example shown, the element B is accessed and routed to the functional unit 130 as shown by arrow 135'. The source element B may alternatively be retrieved from a memory location in some embodiments.

The functional unit converts the value B from the first format (F1) into a plurality of values in the second format (F2). This plurality of values is then stored in the second register 120 as shown by arrow 135". The plurality of values each may correspond to a sub element of B (e.g., B1, B2, B3, and B4) represented in a different format. In some embodiments, the value B from the register 125 may have sub elements simply delineated by bit positions (e.g., bit positions 1 through N are sub element 1, bit positions N+1 through 2N are sub element 2, etc.). In other embodiments, a particular conversion of the entire number into four different components mathematically derived from the total number is possible.

It may be advantageous to break down a set of smaller sub elements in a first format into the same number of elements in a more expanded or detailed format in a variety of applications. For example, pixel data may comprise a number of components but pixels may be generally manipulated or moved as a unit. Therefore, elements A, B, C and D in register 125 may be individual pixels. It may be advantageous to manipulate the sub elements of these pixels. Therefore, a convert operation according to disclosed techniques can be used to extract the pixel sub element (component) information for further processing in another format. Performing the conversion of all of the individual sub elements of a pixel in response to a single control signal may greatly expedite pixel processing sequences in some cases.

Similarly, it may be advantageous to convert data such as pixel data back to a compact format after processing in the second format. As such, the functional unit 130 may perform such a conversion in response to a second control signal as indicated by arrow 140. In response to the second control signal, the functional unit 130 retrieves the four components of the value B from the register 120 in the second format (arrow 140'), converts these four components into the first format, and stores the combined value (B) in the register 125 as indicated by arrow 140". In this case, a larger set of bits from each of multiple packed data elements is reduced into a smaller set (fewer bits) and stored into one position of a register that can hold multiple elements of a packed data.

Figure 2A:
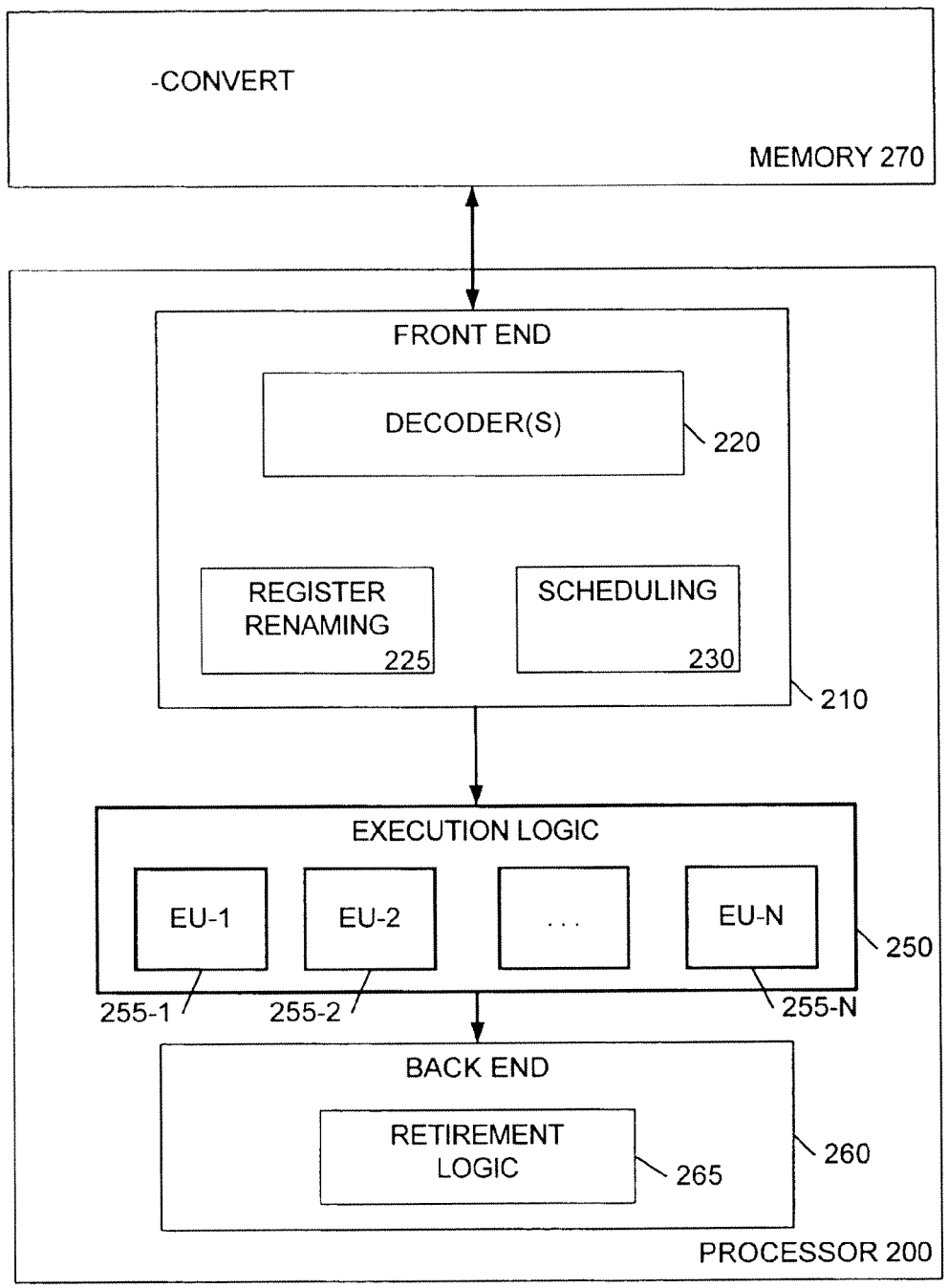
FIG. 2a illustrates further details of a processing apparatus according to one embodiment.

FIG. 2a illustrates a more detailed view of a processor 200 according to one embodiment. FIG. 2a also illustrates a memory 270 coupled to the processor 200. The memory 270 may be any of a wide variety of memories (including various layers of memory hierarchy) as are known or otherwise available to those of skill in the art. The processor 200 follows a program sequence including at least one convert instruction. The convert instruction enters a front end portion 210 and is processed by one or more decoders 220. The decoder may generate as its output a micro operation such as a fixed width micro operation in a predefined format, or may generate other instructions, microinstructions, or control signals which reflect the original convert instruction. The front end 210 also includes register renaming logic 225 and scheduling logic 230 which generally allocate resources and queue the operation corresponding to the convert instruction for execution.

The processor 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The execution logic performs the operations specified by the convert instruction as will be discussed further below with respect to FIG. 2b.

Once execution of the specified operations completes, back end logic 260 retires the instructions. In one embodiment, the processor 200 allows out of order execution but requires in order retirement of instructions. Retirement logic 265 may take a variety of forms as known to those of skill in the art (e.g., re-order buffers or the like).

Figure 2B:
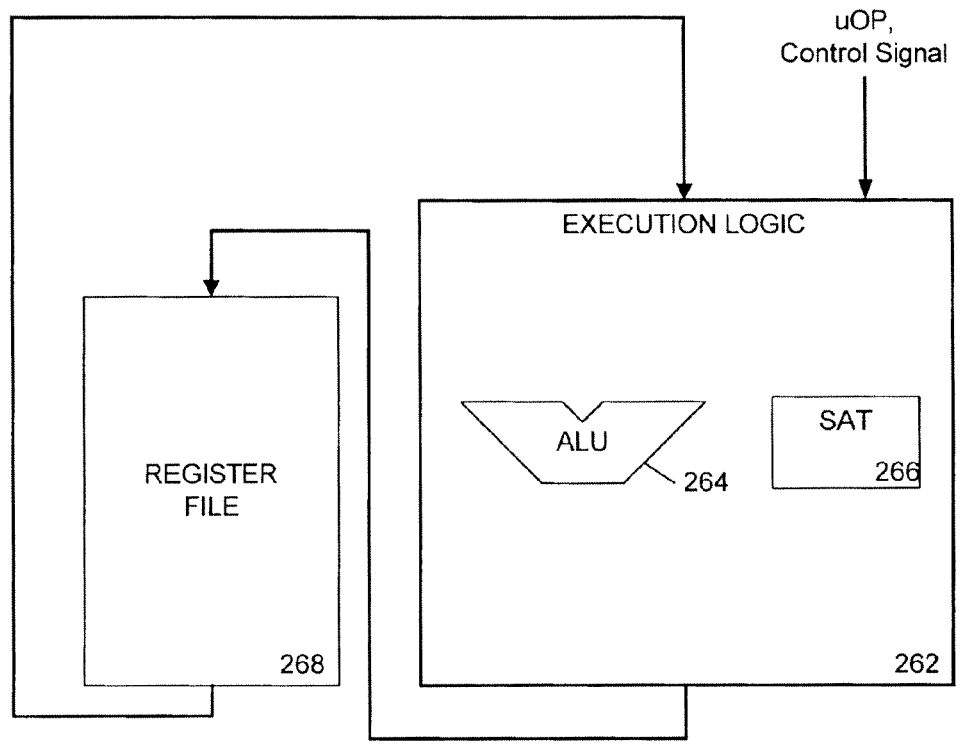
FIG. 2b illustrates details for a functional unit that may perform conversion according to one embodiment.

FIG. 2b illustrates further details of the interaction between an execution unit 262 and a register file 268. The execution unit 262 includes an arithmetic logic unit (ALU) 264 as well as saturation circuitry 266. Depending on the conversion, the ALU may convert from integer to floating point or vice versa according to the received micro operation or control signal. Also, depending on the operation, the inputs may be signed or unsigned, and the arithmetic may be appropriately adjusted.

In one embodiment, multiple ALU portions are available to perform conversions in parallel or simultaneously. One ALU may be adapted to operate on larger operands or on multiple smaller operands in parallel. Conversions are considered to be performed simultaneously when dispatched in a single clock cycle of the processor. For example, the four conversions shown in FIG. 1 may be dispatched to ALU logic together to rapidly generate a result. In other embodiments, less logic circuitry may be provided and accordingly the logic may be re-used by sequentially performing one or more iterations of less than the full set of conversions.

The conversion result may be saturated, for example in the event of a conversion from a floating point value to an integer value. A floating point value typically is capable of representing a larger range of values than an integer format using the same number of bits. The floating point values have even more potential to exceed the range of an integer format if the floating point representation has a larger number of bits than the integer format. Therefore, when converting from floating point to integer, it may be desirable to saturate the value, meaning that if the floating point value was beyond the range that the integer format, then the corresponding extrema of the integer range is used. For example, if a floating point number is a negative number beyond the range of the integer format, then the smallest negative integer number is used under the process of saturation. Similarly, if the floating point number is a positive number that is greater than the highest integer number available according to the integer number format, then the highest integer is used. Alternative techniques such as wrapping (ignoring higher order bits) or truncation (removing low order bits) may be used in alternative embodiments.

Figure 2C:
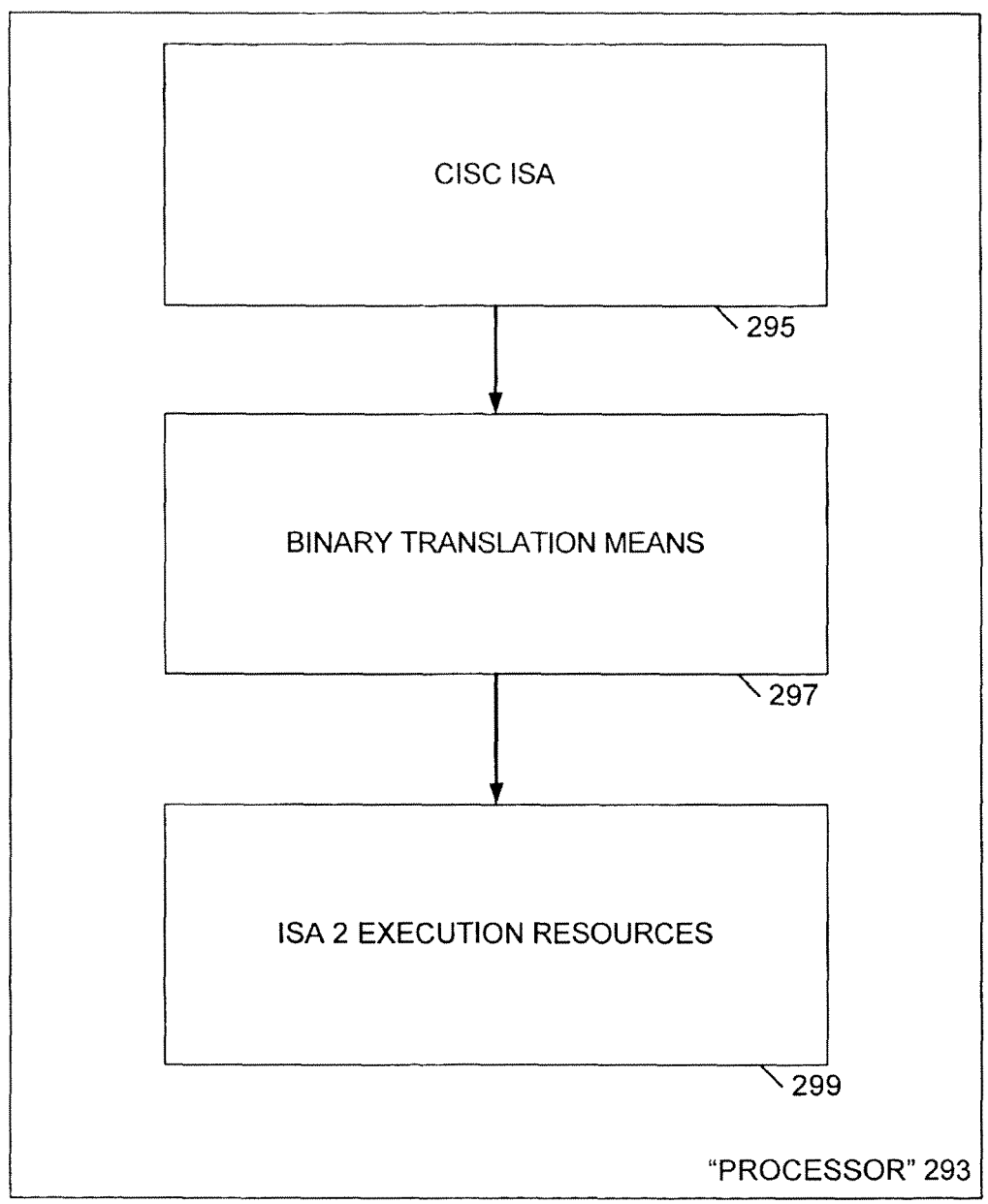
FIG. 2c illustrates an instruction format according to one embodiment.

FIG. 2c illustrates one alternative implementation of a processor 293. In the embodiment of FIG. 2c, a first module 295 receives (and/or fetches) instructions in a first Instruction Set Architecture (ISA) such as a CISC ISA. A binary translation means 297 then converts the instructions from the first ISA to a second ISA. The binary translation means 297 typically comprises a software program that converts from one ISA to another ISA. The binary translation software program may execute on a processor to convert the first ISA instructions to the second ISA. Alternatively, hardware, firmware, or mix of any of hardware, firmware and software structures may be used to provide a translation layer. Execution resources for the second ISA 299 then execute the instructions in the second ISA. The execution resources 299 may be the same resources that execute the binary translation software program if a binary translation program is used.

Figure 2D:
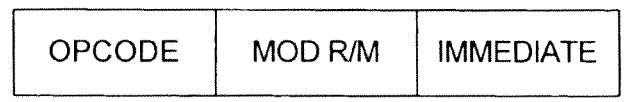
FIG. 2d illustrates a processing apparatus according to one embodiment.

FIG. 2d illustrates one embodiment of an instruction format that may be used with disclosed conversion instructions. This format includes an opcode, a MOD R/M byte, and an immediate operand. The MOD R/M byte includes a mod field (bits 7:6), a reg/opcode field (bits 5:3) and an r/m field (bits 2:0). The mod field combines with the r/m field to form 32 possible values, eight registers and twenty four addressing modes. The reg/opcode field specifies either a register number or three more bits of opcode information. The purpose of the reg/opcode field is specified in the primary opcode. The r/m field can specify a register as an operands or can be combined with the mod field to encode an addressing mode. Thus, the MOD r/m field provides source and destination specifiers. In the case of a source memory operand, additional address information is also specified in addition to the MOD r/m field. Of course other formats of instructions may also be used as may be particularly suitable to a particular implementation or application or to conform to a different ISA, and therefore other encodings may be used as source and destination specifiers.

Figure 2E:
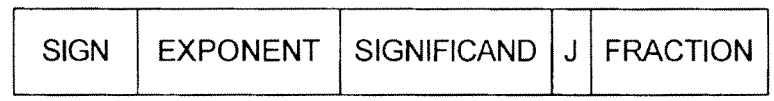
FIG. 2e illustrates a floating point format according to one embodiment.

FIG. 2e is a binary floating-point format used by one embodiment. This format may conform to an IEEE standard (e.g., 854-1987 IEEE Standard for Radix-Independent Floating-Point Arithmetic 1987). The sign is a binary value that indicates the number is positive (0) or negative (1). The significand has two parts: a 1-bit binary integer, also referred to as the J-bit; and, a binary fraction. In other embodiments, the J-bit is not explicitly represented, but instead is an implied value. The exponent is a binary integer that represents the base-2 power to which the significand is raised.

Figure 3A:
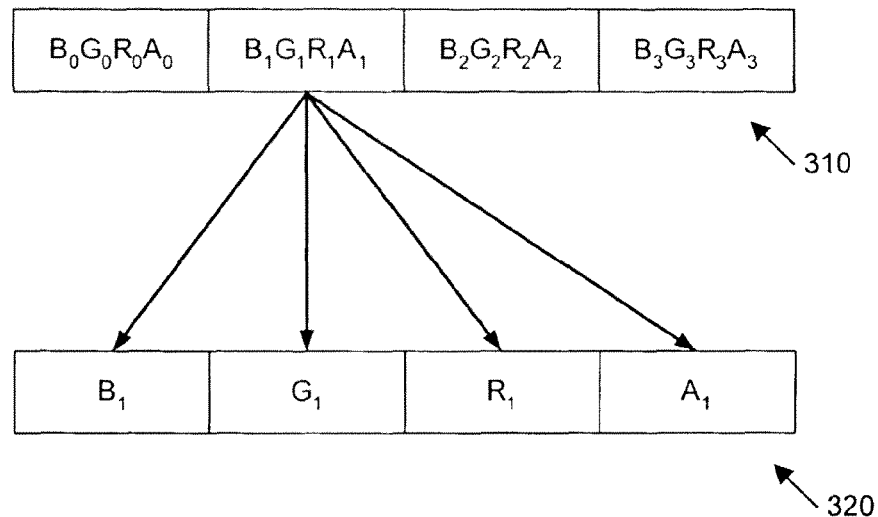
FIG. 3a illustrates conversions performed according to one embodiment of a first integer type to floating point conversion instruction.

FIG. 3a illustrates conversions performed according to one embodiment of a convert instruction. In this example, each arrow represents an integer to floating point conversion. Therefore, in this example, each sub element, $B_1$, $G_1$, $R_1$, $A_1$ the of second packed data element ($B_1G_1R_1A_1$) is converted into a floating point number, with each floating point number taking up the same number of bits as the entire integer element. The four sub elements of the second packed data element in the source register 310 are converted and stored in the destination register 320 as four packed data elements in an order defined by the four sub element positions in the register 310.

The RGB & A labels for the data sub elements indicate that the data may be integer representations of the red, green, blue, and alpha components of a pixel. In one embodiment, one byte dedicated to each of the RGBA components is converted to a thirty-two bit floating point representation (may be referred to as "single precision" floating point representation). Thus, four eight-bit-bytes of the RBGA thirty-two-bit data may be converted into four thirty-two bit floating point numbers.

In general, according to such an instruction, M sub elements of single element of a packed data that has M elements are converted, expanded and stored as M elements of a destination packed data storage location, where each element has a power-of-two multiple of the number of bits of the sub elements. For example, the elements may each have N bits, and the sub elements may have N/M bits, where M is a power of two (i.e., $M=2^K$, where K is a positive integer value). It will be apparent to one of skill in the art that the widths of these elements may be scaled up. For example, each sub element may be sixteen or thirty-two bits and therefore a pixel may encompass respectively sixty-four or one hundred and twenty-eight bits. The corresponding floating point numbers may be expanded into two hundred fifty-six or five hundred and twelve bit registers, or a different number of bits if a different number of bits is used in the floating point representation. Additionally, as will be apparent with respect to further embodiments below, the number of packed data elements and sub elements need not be the same.

In the embodiment shown in FIG. 3a, the second packed data element ($B_1G_1R_1A_1$) is converted. The second element may be selected for conversion by providing an immediate operand to the convert instruction. The immediate operand can encode which of the packed data elements of the packed data should be converted. Other techniques such as specifying a location by setting a value in another storage location (e.g., another register) may also be used in some embodiments. Alternatively, a dedicated convert instruction may be provided so that the opcode directly encodes which one of the several packed data elements to convert.

Figure 3B:
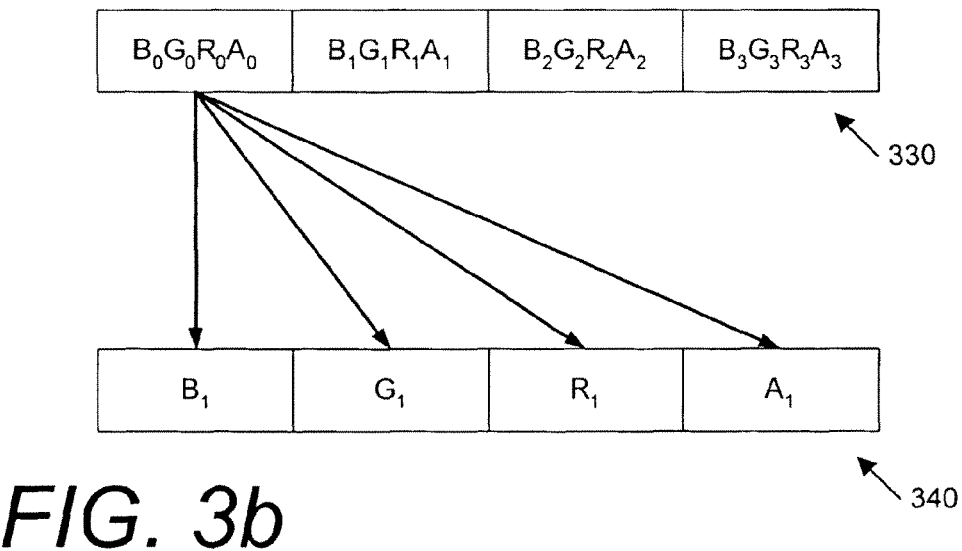
FIG. 3b illustrates conversions performed according to another embodiment of a first integer type to floating point conversion instruction.

For example, the embodiment of FIG. 3b illustrates a conversion that is similar to that of FIG. 3a in that RGBA data from one element of a first register 330 is converted and stored in the four elements of a second register 340, except that the first element of the packed data is converted. This may be accomplished by having a dedicated instruction that automatically converts the first element in the source register. Another three dedicated instructions may be used to convert the remaining three elements of the packed data. However, another approach is to use shift instructions to shift data into the first position, and then the dedicated instruction that automatically converts the first element in the source register may be used again to convert each subsequent element. This shift and convert approach advantageously uses fewer opcodes and avoids the use of immediates, but expands code by using additional shift instructions.

Figure 4A:
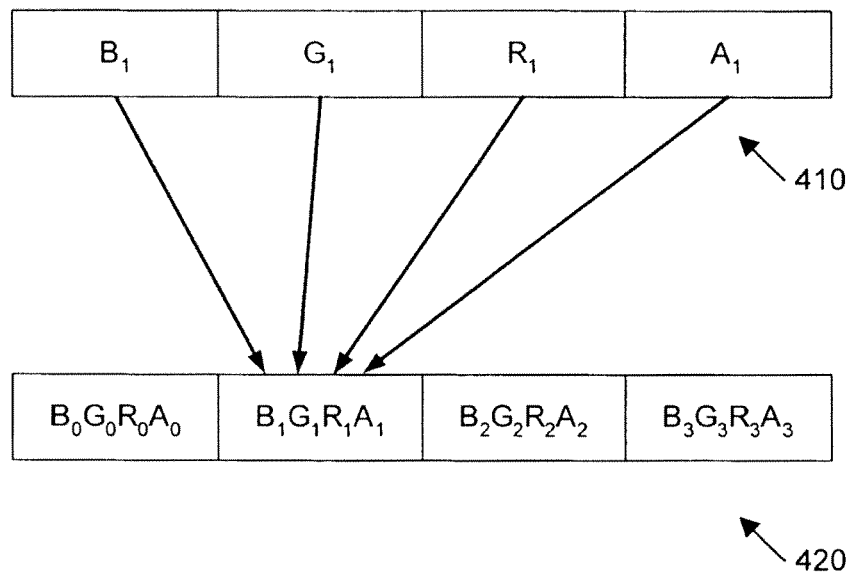
FIG. 4a illustrates conversions performed according to one embodiment of a floating point to the first integer type conversion instruction.

FIG. 4a illustrates conversions performed according to one embodiment of another convert instruction. In this example, each arrow represents a floating point to integer conversion. Each of the four components $B_1$, $G_1$, $R_1$, $A_1$ from a first register 410 is converted from floating point format to an integer format and stored as a sub element of one element in a second register 420. In this case, the second element in the register 420 is the destination for the sub elements. Which of the elements of the packed data becomes the destination for the four sub elements may again be selected by an immediate operand provided with the instruction, or may be established by the instruction itself or other indirect means as previously discussed. The order of the four sub elements within the selected element of the destination register 420 is defined by the positions of the data elements in the source register 410. As previously, RGBA data is merely illustrative of one type and format of data that may be manipulated according to such instructions, and other forms or other types of data may be used.

Figure 4B:
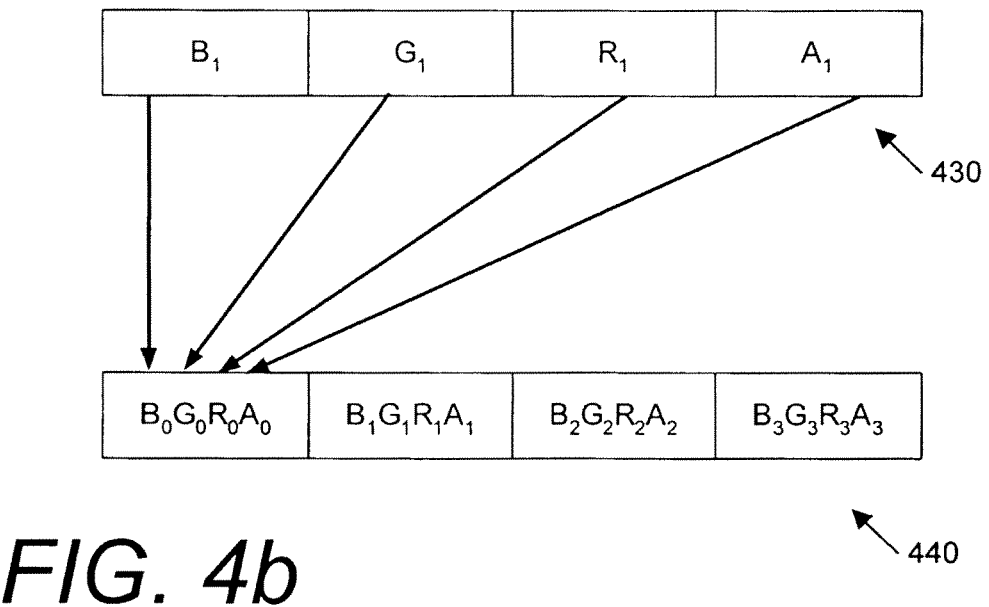
FIG. 4b illustrates conversions performed according to another embodiment of a floating point to first integer type conversion instruction according to one embodiment.

FIG. 4b illustrates an example similar to that of FIG. 4a in that a packed data of multiple floating point numbers from a first register 430 is converted to multiple integer sub elements of a packed data element and stored in a subset of the locations of a second register 440. However, in the case of FIG. 4b, the first element in the register 440 is filled by the instruction. This may be the case where a different immediate operand is used or may be the case where a single dedicated conversion instruction of this type is provided and shifts are relied upon to move the data to other packed data element positions.

Figure 5:
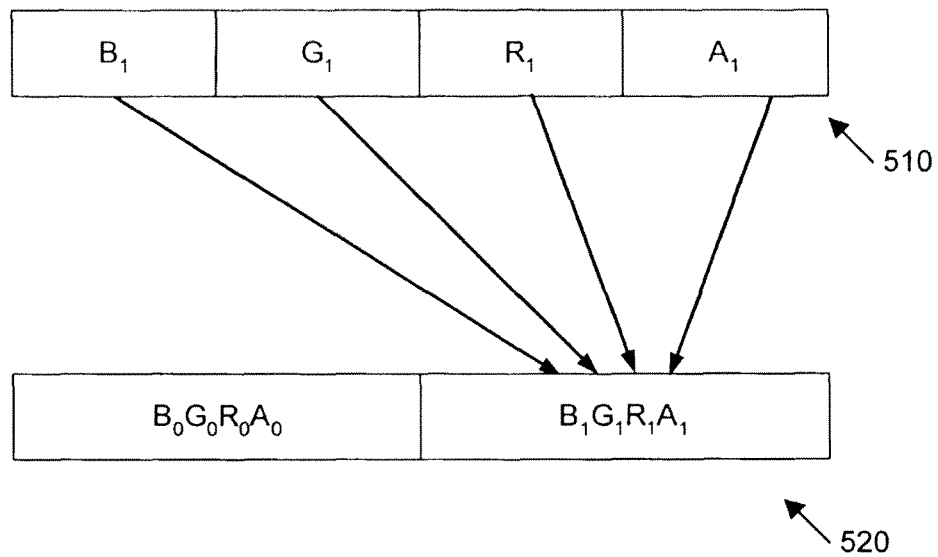
FIG. 5 illustrates conversions performed according to one embodiment of a second integer type to floating point conversion instruction.

FIG. 5 illustrates conversions performed according to one embodiment of another convert instruction. The embodiment of FIG. 5 is similar to the embodiment of FIG. 4a except that the data elements in integer form are of higher precision. In this example, each arrow represents a floating point to integer conversion. Therefore, in the embodiment of FIG. 5, the RGBA components in floating point format are read from a first register 510, converted from floating point to integer, and stored in a second register 520. Again, the positioning in the destination register may be specified as previously discussed.

In the embodiment of FIG. 5, each RGBA pixel in the destination consumes one half of the destination register 520 because each of the individual sub elements has one half of the number of bits as the floating point representation. For example, in one embodiment, each of the integer components is sixteen bits, and each floating point component is a single precision floating point number having thirty-two bits. In another embodiment, each integer component may be thirty-two bits and each floating point value may be sixty-four bits (e.g., with two hundred and fifty six bit registers). Various other permutations will be apparent to those of skill in the art.

Figure 6:
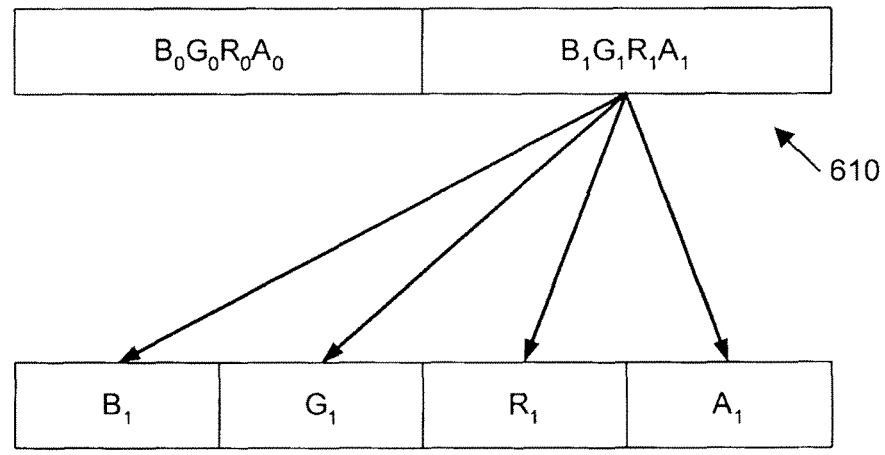
FIG. 6 illustrates conversions performed according to one embodiment of a floating point to second integer type conversion instruction.

FIG. 6 illustrates conversions performed according to one embodiment of another convert instruction. In this example, each arrow represents an integer to floating point conversion. Each of the four components $B_1$, $G_1$, $R_1$, $A_1$ from one element of a first register 610 is converted from floating point format to an integer format and stored as a sub element of one element in a second register 620. In this case, the second element in the register 620 is the destination for the sub elements. Which of the elements of the packed data becomes the destination for the four sub elements may again be selected by an immediate variable provided with the instruction, or may be established by the instruction itself or other indirect means as previously discussed. The order of the four sub elements within the selected element of the destination register 620 is defined by the positions of the data elements in the source register 610.

The example of FIG. 6 is similar to that of FIG. 3a except that the data elements in integer form are of higher precision. Therefore, only two pixels are stored in a single register, and one of the two pixels may be expanded to fill the entire destination register. In one embodiment, each of the integer components is sixteen bits, and each floating point component is a single precision floating point number having thirty-two bits. In another embodiment, each integer component may be thirty-two bits and each floating point value may be sixty-four bits (e.g., with two hundred and fifty six bit registers). Various other permutations will be apparent to those of skill in the art.

The following table summarizes one example set of conversion instructions.

EXAMPLE INSTRUCTIONS

| Mnemonic | Function | Size Src | Reg Src | Size Dst | Reg Dst |
|---|---|---|---|---|---|
| CVTB2PS | Convert Byte to Packed Single Precision Floating-Point Value | 4 8 bit integers | Xmm or m32 | 4 32 bit FP | Xmm |
| CVTUB2PS | Convert Unsigned Byte to Packed Single Precision Floating-Point Value | 4 8 bit unsigned integers | Xmm or m32 | 4 32 bit FP | Xmm |
| CVTW2PS | Convert Word to Packed Single Precision Floating-Point Value | 4 16 bit integers | Xmm | 4 32 bit SP FP | Xmm |
| CVTUW2PS | Convert Unsigned Word to Packed Single Precision Floating-Point Value | 4 16 bit unsigned integers | Xmm | 4 32 bit SP FP | Xmm |
| CVTPS2PB | Convert Packed Single Precision Floating-Point Value to Word (with saturation or different rounding mode versions) | 4 32 bit SP FP | Xmm or m128 | 4 8 bit integers | Xmm |
| CVTPS2UPW | Convert Packed Single Precision Floating-Point Value to Unsigned Word (with saturation or different rounding mode versions) | 4 32 bit SP FP | Xmm | 4 16 bit unsigned integers | Xmm |

Example of Convert Byte to Packed Single Precision Floating Point

CVT[U]B2PS xmm1, xmm2/m128, imm8

```
if (imm8 == 0)
{
  //convert xmm2 pixel 0's r,g,b,a channels to SP FP
  DEST[31-0] = Convert_Integer_To_Single_Precision_Floating_Point(SRC[7-0]);
  DEST[63-32] = Convert_Integer_To_Single_Precision_Floating_Point(SRC[15-8]);
  DEST[95-64] = Convert_Integer_To_Single_Precision_Floating_Point(SRC[23-16]);
  DEST[127-96] = Convert_Integer_To_Single_Precision_Floating_Point(SRC[31-24]);
}
else if (imm8 == 1)
{
  //convert xmm2 pixel 1's r,g,b,a channels to SP FP
  DEST[31-0] = Convert_Integer_To_Single_Precision_Floating_Point(SRC[39-32]);
  DEST[63-32] = Convert_Integer_To_Single_Precision_Floating_Point(SRC[47-40]);
  DEST[95-64] = Convert_Integer_To_Single_Precision_Floating_Point(SRC[55-48]);
  DEST[127-96] = Convert_Integer_To_Single_Precision_Floating_Point(SRC[63-56]);
}
else if (imm8 == 2)
{
  //convert xmm2 pixel 2's r,g,b,a channels to SP FP
  DEST[31-0] = Convert_Integer_To_Single_Precision_Floating_Point(SRC[71-64]);
  DEST[63-32] = Convert_Integer_To_Single_Precision_Floating_Point(SRC[79-72]);
  DEST[95-64] = Convert_Integer_To_Single_Precision_Floating_Point(SRC[87-80]);
  DEST[127-96] = Convert_Integer_To_Single_Precision_Floating_Point(SRC[95-88]);
}
else if (imm8 == 3)
{
  //convert xmm2 pixel 3's r,g,b,a channels to SP FP
  DEST[31-0] = Convert_Integer_To_Single_Precision_Floating_Point(SRC[103-96]);
  DEST[63-32] = Convert_Integer_To_Single_Precision_Floating_Point(SRC[111-104]);
  DEST[95-64] = Convert_Integer_To_Single_Precision_Floating_Point(SRC[119-112]);
  DEST[127-96] = Convert_Integer_To_Single_Precision_Floating_Point(SRC[127-120]);
}
```

Example of Convert Word to Packed Single Precision Floating Point

CVT[U]W2PS xmm1, xmm2/m128, imm8

```
if (imm8 == 0)
{
  //convert xmm2 pixel 0's r,g,b,a channels to SP FP
  DEST[31-0] = Convert_Integer_To_Single_Precision_Floating_Point(SRC[15-0]);
  DEST[63-32] = Convert_Integer_To_Single_Precision_Floating_Point(SRC[31-16]);
  DEST[95-64] = Convert_Integer_To_Single_Precision_Floating_Point(SRC[47-32]);
  DEST[127-96] = Convert_Integer_To_Single_Precision_Floating_Point(SRC[63-48]);
}
else if (imm8 == 1)
{
  //convert xmm2 pixel 1's r,g,b,a channels to SP FP
  DEST[31-0] = Convert_Integer_To_Single_Precision_Floating_Point(SRC[79-64]);
  DEST[63-32] = Convert_Integer_To_Single_Precision_Floating_Point(SRC[95-80]);
  DEST[95-64] = Convert_Integer_To_Single_Precision_Floating_Point(SRC[111-96]);
  DEST[127-96] = Convert_Integer_To_Single_Precision_Floating_Point(SRC[127-112]);
}
```

CVTPS2[U]PB xmm1/m128, xmm2, imm8

```
if (imm8 == 0)
{
  //convert xmm2 pixel 0's r,g,b,a channels to SP FP
  DEST[7-0] = Convert_Single_Precision_Floating_Point_To_Integer (SRC[31-0]);
  DEST[15-8] = Convert_Single_Precision_Floating_Point_To_Integer SRC[63-32]);
  DEST[23-16] = Convert_Single_Precision_Floating_Point_To_Integer(SRC[95-64]);
  DEST[31-24] = Convert_Single_Precision_Floating_Point_To_Integer(SRC[127-96]);
}
else if (imm8 == 1)
{
  //convert xmm2 pixel 1's r,g,b,a channels to SP FP
  DEST[39-32] = Convert_Single_Precision_Floating_Point_To_Integer (SRC[31-0]);
  DEST[47-40] = Convert_Single_Precision_Floating_Point_To_Integer SRC[63-32]);
  DEST[55-48] = Convert_Single_Precision_Floating_Point_To_Integer(SRC[95-64]);
  DEST[63-56] = Convert_Single_Precision_Floating_Point_To_Integer(SRC[127-96]);
}
else if (imm8 == 2)
{
  //convert xmm2 pixel 2's r,g,b,a channels to SP FP
  DEST[71-64] = Convert_Single_Precision_Floating_Point_To_Integer (SRC[31-0]);
  DEST[79-72] = Convert_Single_Precision_Floating_Point_To_Integer SRC[63-32]);
  DEST[87-80] = Convert_Single_Precision_Floating_Point_To_Integer(SRC[95-64]);
  DEST[95-88] = Convert_Single_Precision_Floating_Point_To_Integer(SRC[127-96]);
}
else if (imm8 == 3)
{
  //convert xmm2 pixel 3's r,g,b,a channels to SP FP
  DEST[103-96] = Convert_Single_Precision_Floating_Point_To_Integer (SRC[31-0]);
  DEST[111-104] = Convert_Single_Precision_Floating_Point_To_Integer SRC[63-32]);
  DEST[119-112] = Convert_Single_Precision_Floating_Point_To_Integer(SRC[95-64]);
  DEST[127-120] = Convert_Single_Precision_Floating_Point_To_Integer(SRC[127-96]);
}
```

CVTPS2[U]PW xmm1/m128, xmm2, imm8

```
if (imm8 == 0)
{
  //convert xmm2 pixel 0's r,g,b,a channels to SP FP
  DEST[15-0] = Convert_Single_Precision_Floating_Point_To_Integer (SRC[31-0]);
  DEST[31-16] = Convert_Single_Precision_Floating_Point_To_Integer SRC[63-32]);
  DEST[47-32] = Convert_Single_Precision_Floating_Point_To_Integer(SRC[95-64]);
  DEST[63-48] = Convert_Single_Precision_Floating_Point_To_Integer(SRC[127-96]);
}
else if (imm8 == 1)
{
  //convert xmm2 pixel 1's r,g,b,a channels to SP FP
  DEST[79-64] = Convert_Single_Precision_Floating_Point_To_Integer (SRC[31-0]);
  DEST[95-80] = Convert_Single_Precision_Floating_Point_To_Integer SRC[63-32]);
```

```
    DEST[111-96] = Convert_Single_Precision_Floating_Point_To_Integer(SRC[95-64]);
    DEST[127-112] = Convert_Single_Precision_Floating_Point_To_Integer(SRC[127-96]);
}
```

Figure 7A:
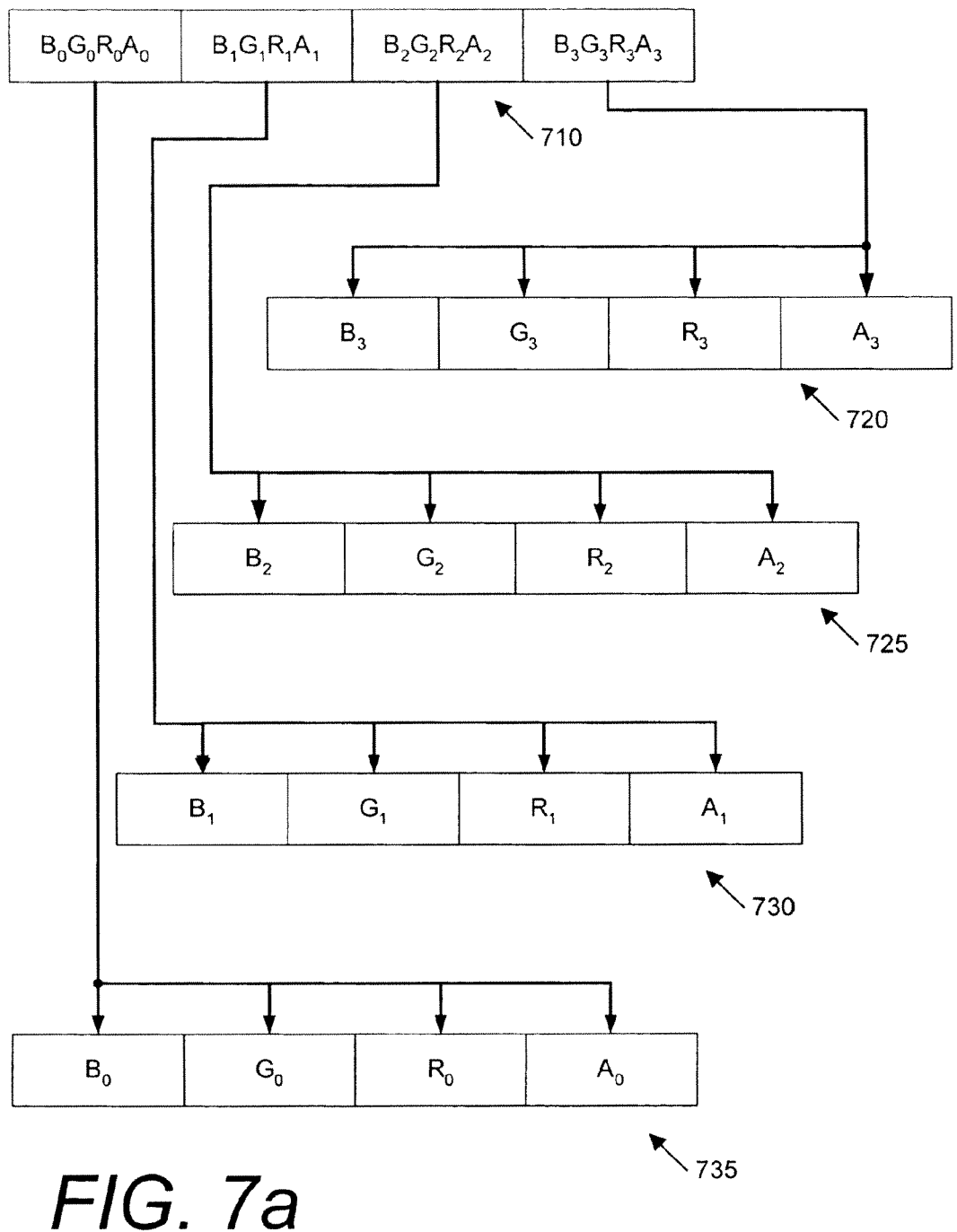
FIG. 7a illustrates conversions performed according to one embodiment of an alternative conversion to floating point instruction.

FIG. 7a illustrates one alternative convert instruction that adds further functionality to the single instruction. Such an embodiment may be useful to further reduce code size when multiple instantiations of the single-element convert instructions are commonly used to convert to and from a full register of SIMD values. In the embodiment of FIG. 7a, four values (e.g., pixel values) stored in a first register 710 are converted and stored into four separate registers 720, 725, 730 and 735. While these conversions are done in response to a single instruction (e.g., macroinstruction) in this example, in some cases insufficient parallel hardware may be available to perform the conversions in parallel. Therefore, multiple micro operations may be generated in response to such a macroinstruction and conversion hardware may be used serially to perform the sixteen conversions.

In the embodiment of FIG. 7a, each arrow represents an integer to floating point conversion. Thus, a first data element ($B_0G_0R_0A_0$) in integer format in the source register 710 is converted into four floating point values in the destination register 735. Ordering of the elements again follows the source sub elements. Moreover, a variety of sizes of the elements and sub elements may be used as previously discussed. Likewise, a second data element ($B_1G_1R_1A_1$) in integer format in the source register 710 is converted into four floating point values in the destination register 730, a third data element ($B_2G_2R_2A_2$) in integer format in the source register 710 is converted into four floating point values in the destination register 725, and a fourth data element ($B_3G_3R_3A_3$) in integer format in the source register 710 is converted into four floating point values in the destination register 720.

Figure 7B:
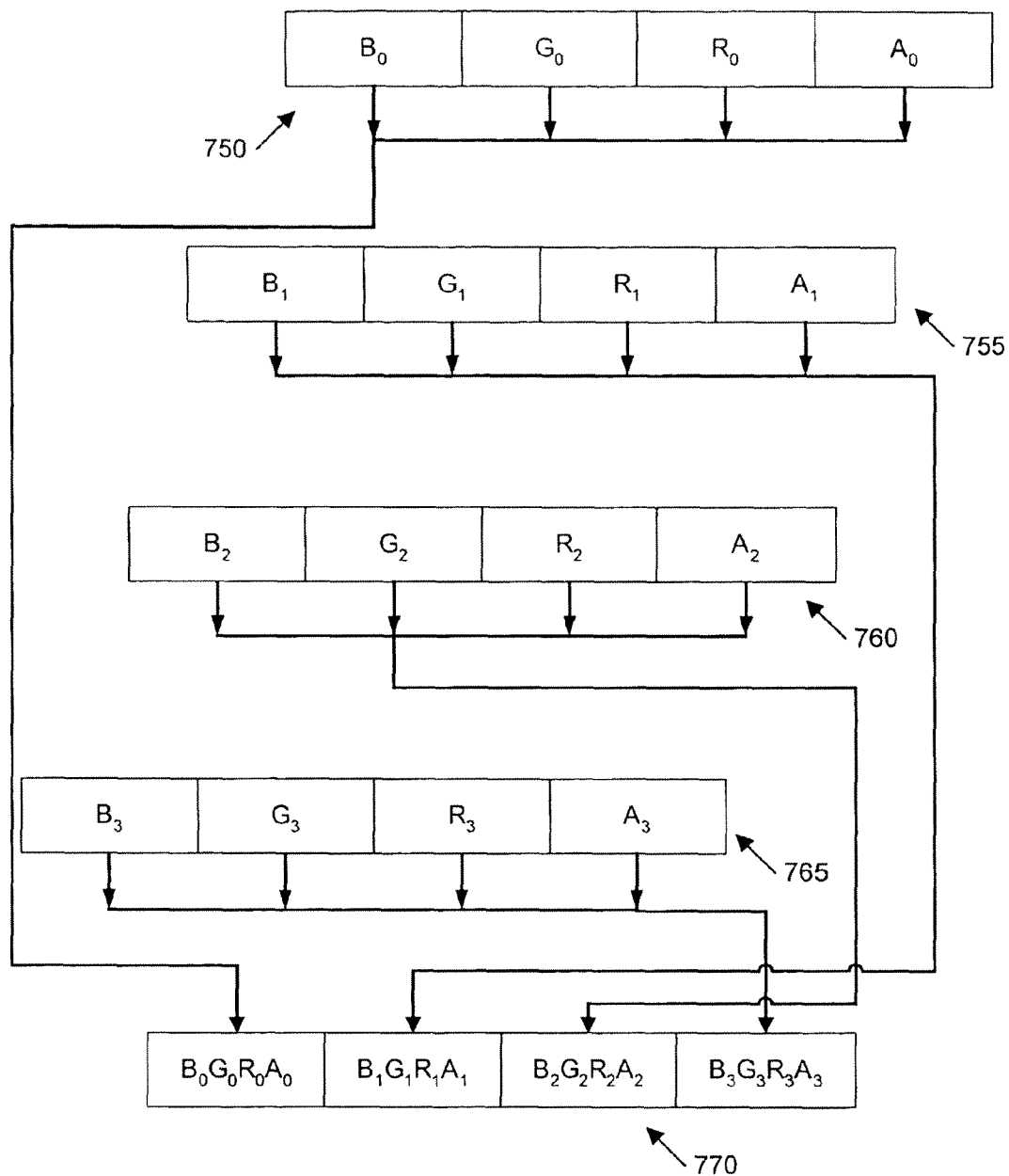
FIG. 7b illustrates conversions performed according to one embodiment of an alternative conversion from floating point instruction.

FIG. 7b illustrates a converse case of FIG. 7a, in which four registers containing floating point values are compacted into a single register containing integer values. Thus, in the embodiment of FIG. 7b, each arrow represents a floating point to integer conversion. Four separate floating point values $B_0$, $G_0$, $R_0$, $A_0$ from a first source register 750 are converted to integer format and stored in the first element position of a destination register 770. Likewise, the four separate floating point values $B_1$, $G_1$, $R_1$, $A_1$ from a second source register 755 are converted to integer format and stored in the second element position of the destination register 770, the four separate floating point values $B_2$, $G_2$, $R_2$, $A_2$ from a third source register 760 are converted to integer format and stored in the third element position of the destination register 770, and the four separate floating point values $B_3$, $G_3$, $R_3$, $A_3$ from a fourth source register 765 are converted to integer format and stored in the fourth element position of the destination register 770.

Figure 8A:
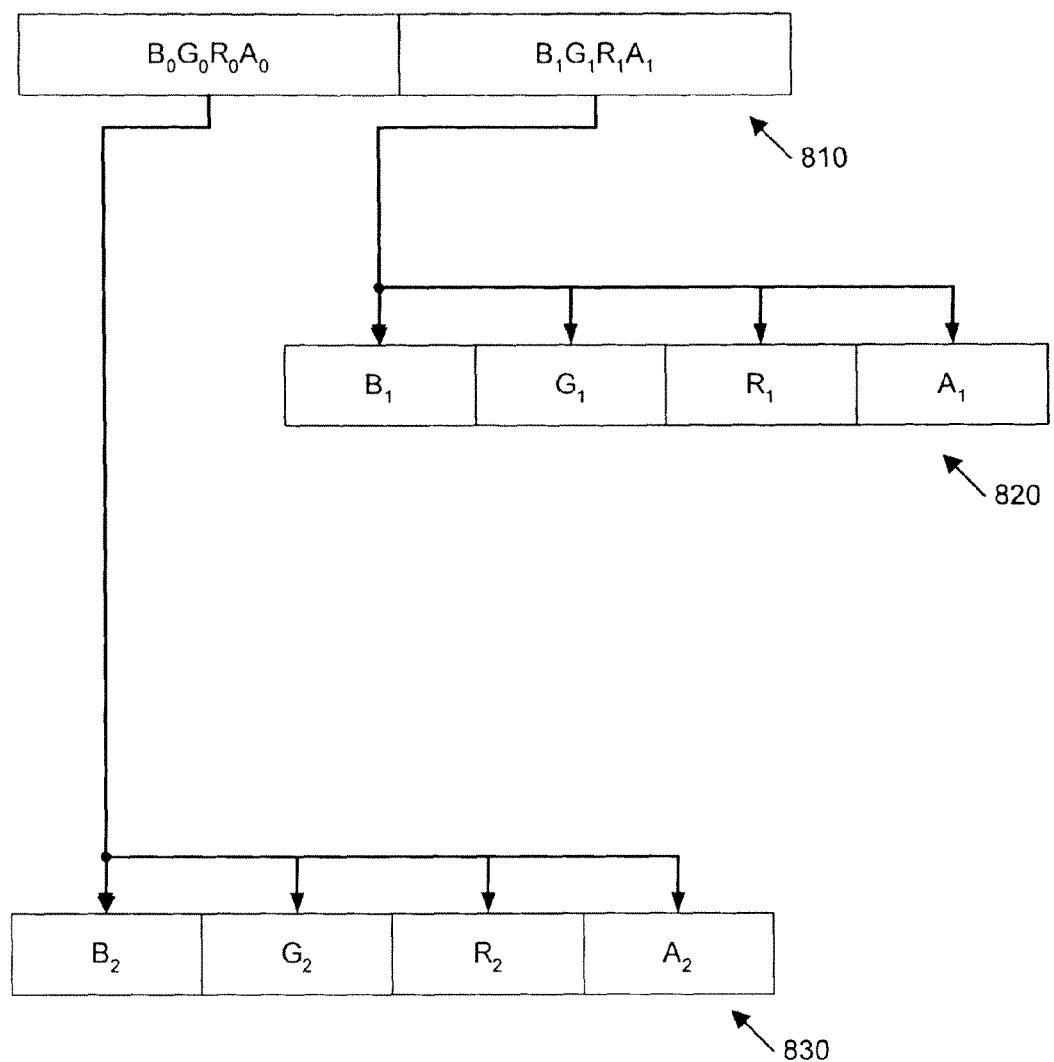
FIG. 8a illustrates conversions performed according to one embodiment of another alternative conversion to floating point instruction.

FIG. 8a illustrates operations for another convert instruction similar to that of FIG. 7a except that the integer elements are larger in proportion to the floating point elements than in FIG. 7a. To be clear, each arrow in FIG. 8a represents an integer to floating point conversion. A first element ($B_0G_0R_0A_0$) of the packed data stored in a source register 810 in integer format is converted to floating point values and stored in a first destination register 830. A second element ($B_1G_1R_1A_1$) of the packed data stored in the source register 810 in integer format is converted to floating point values and stored in a second destination register 820. Both conversions are done in response to a single instruction in this embodiment, and the ordering of the elements in the respective destination registers follows the ordering of the source sub elements.

Figure 8B:
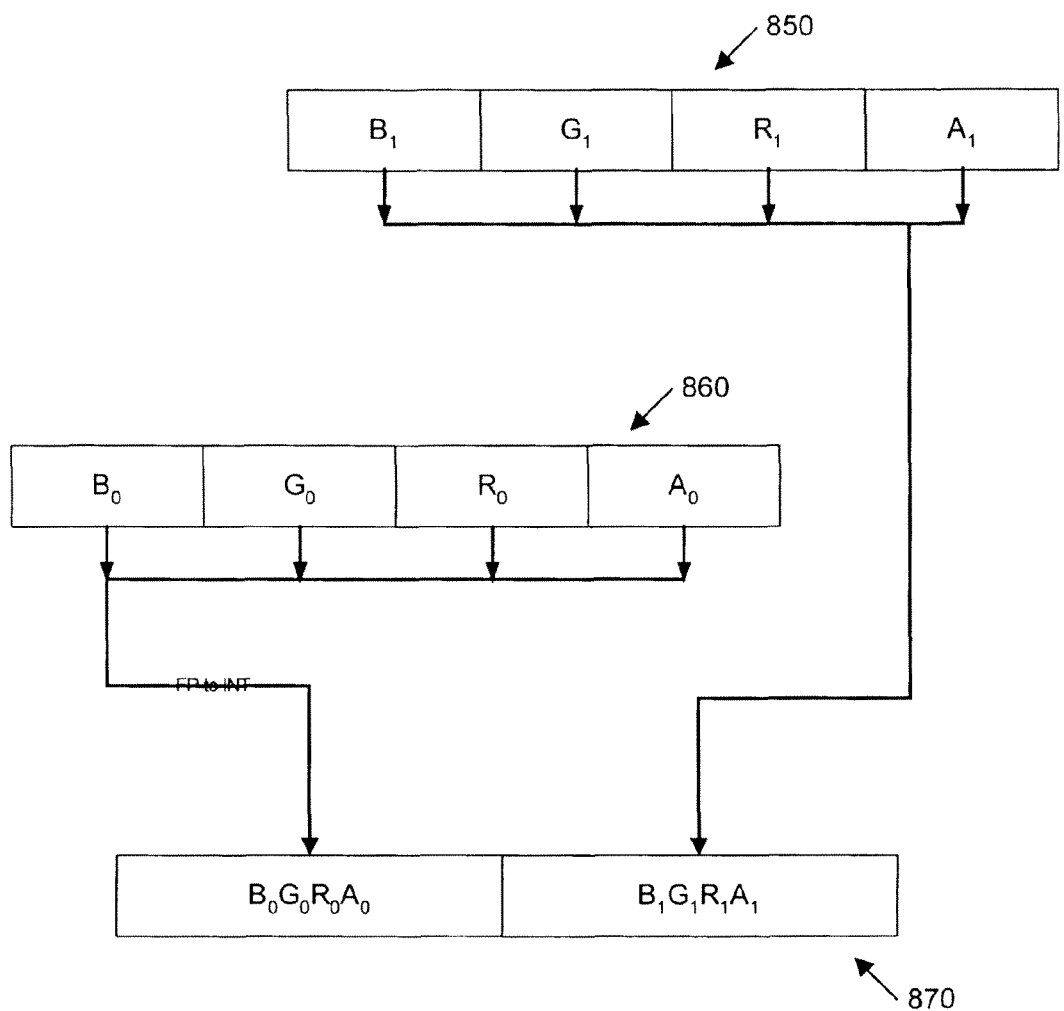
FIG. 8b illustrates conversions performed according to one embodiment of another alternative conversion from floating point instruction.

FIG. 8b illustrates operations for another convert instruction similar to that of FIG. 7b except that the integer elements are larger in proportion to the floating point elements than in FIG. 7b. Each arrow in FIG. 8b represents floating point to integer conversion. Four separate floating point values $B_0$, $G_0$, $R_0$, $A_0$ from a first source register 860 are converted to integer format and stored in the first element position of a destination register 870. Likewise, the four separate floating point values $B_1$, $G_1$, $R_1$, $A_1$ from a second source register 850 are converted to integer format and stored in the second element position of the destination register 870 Both conversions are done in response to a single instruction in this embodiment, and the ordering of the sub elements in the destination register follows the ordering of the source elements.

In many of the above examples, the source and destination storage locations have the same size. In fact, the source and destination may both be registers in a single set of architectural registers (e.g., the xmm registers in a processor like Intel's Pentium® Processors). However, in other embodiments, the source and destination registers need not be of the same size or in the same register set. It may be advantageous in some cases to use a floating point register set that has more bits than the integer register set.

Figure 9:
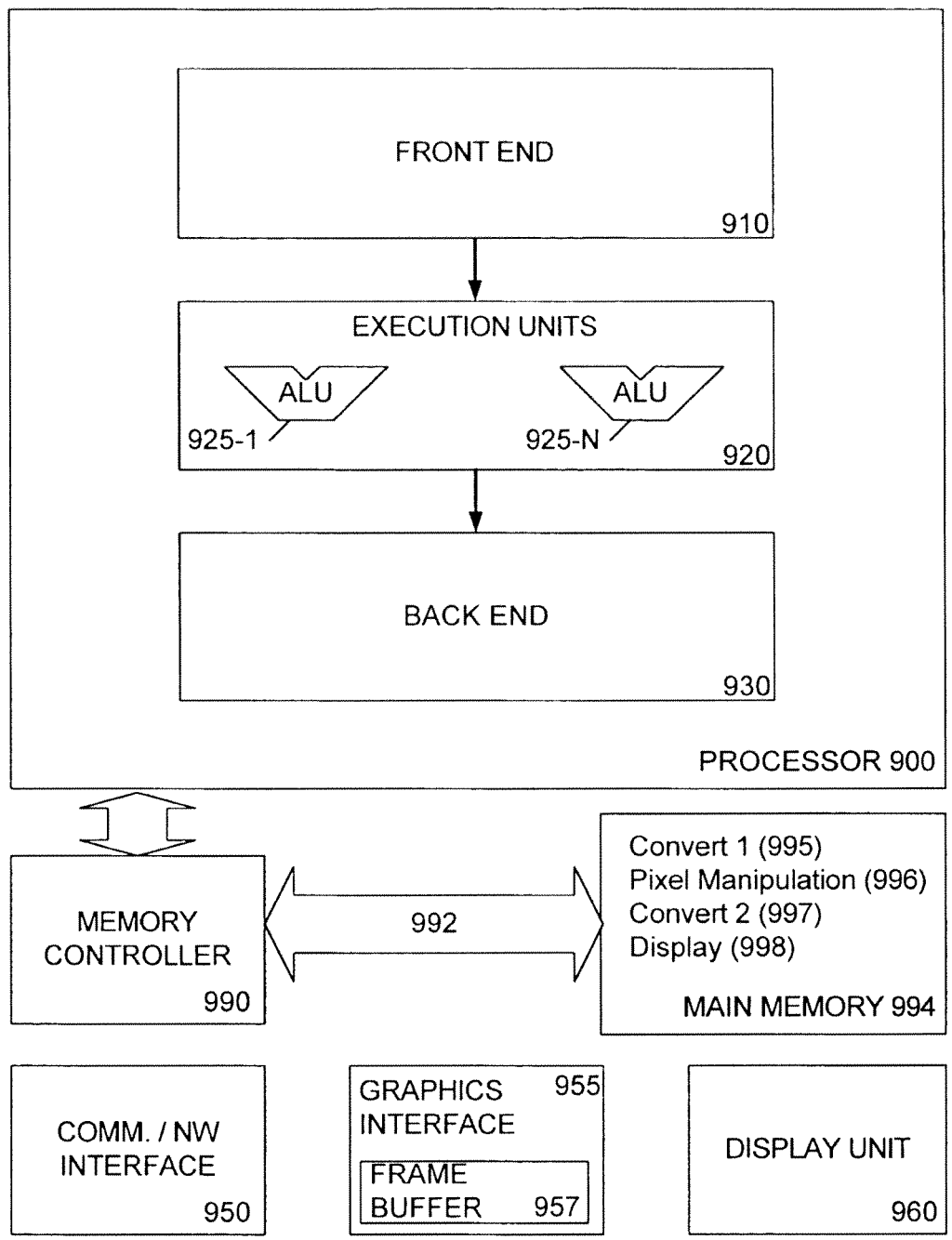
FIG. 9 illustrates one embodiment of a system of that may utilize various ones of the disclosed conversion instructions.

FIG. 9 illustrates one embodiment of a system utilizing disclosed conversion techniques. In this embodiment, a processor 900 is coupled to a memory controller 990. The memory controller may be a component integral with the processor 900 or may be a discrete component in different embodiments. The memory controller 990 is coupled by a bus 992 to a main memory 994. The bus may be any communication bus including but not limited to any one or more of a parallel signaling bus, a serial bus, a multidrop bus, a point-to-point bus, etc. The main memory includes a first convert sequence 995, a pixel manipulation sequence 996, a second convert sequence 997, and a display sequence 998.

The processor 900 includes front end logic 910, execution logic 920, which includes a plurality of ALU circuits 925-1 through 925-N, and back end logic 930. The processor 900 executes instruction sequences fetched from the memory such as the first convert sequence 995, the pixel manipulation sequence 996, the second convert sequence 997 and the display sequence 998. The system also includes a communication/network interface 950. The interface 950 is operatively coupled to the processor 900 such that the processor can send commands to the interface 950 and send and receive data via a network (may be a wired or wireless network) or communications medium. The interface may receive any one or more of the sets of software sequences in electronic format. In any representation of the software sequence, the instructions may be stored or transmitted in any form of a machine readable medium. An optical or electrical wave modulated or otherwise generated to transmit such information, a memory, or a magnetic or optical storage such as a disc may be the machine readable medium. Any of these mediums may store or carry the instruction information.

The system also includes a graphics interface 955 with a frame buffer 957 and a display unit 960. The graphics interface 955 is operatively coupled to the processor (may be one or more interface or bridge components involved in this coupling) such that the processor can send commands and data to the graphics interface 955. Image data may be written to the frame buffer 957 to cause the data to be displayed by the display 960 in some embodiments.

Figure 10:
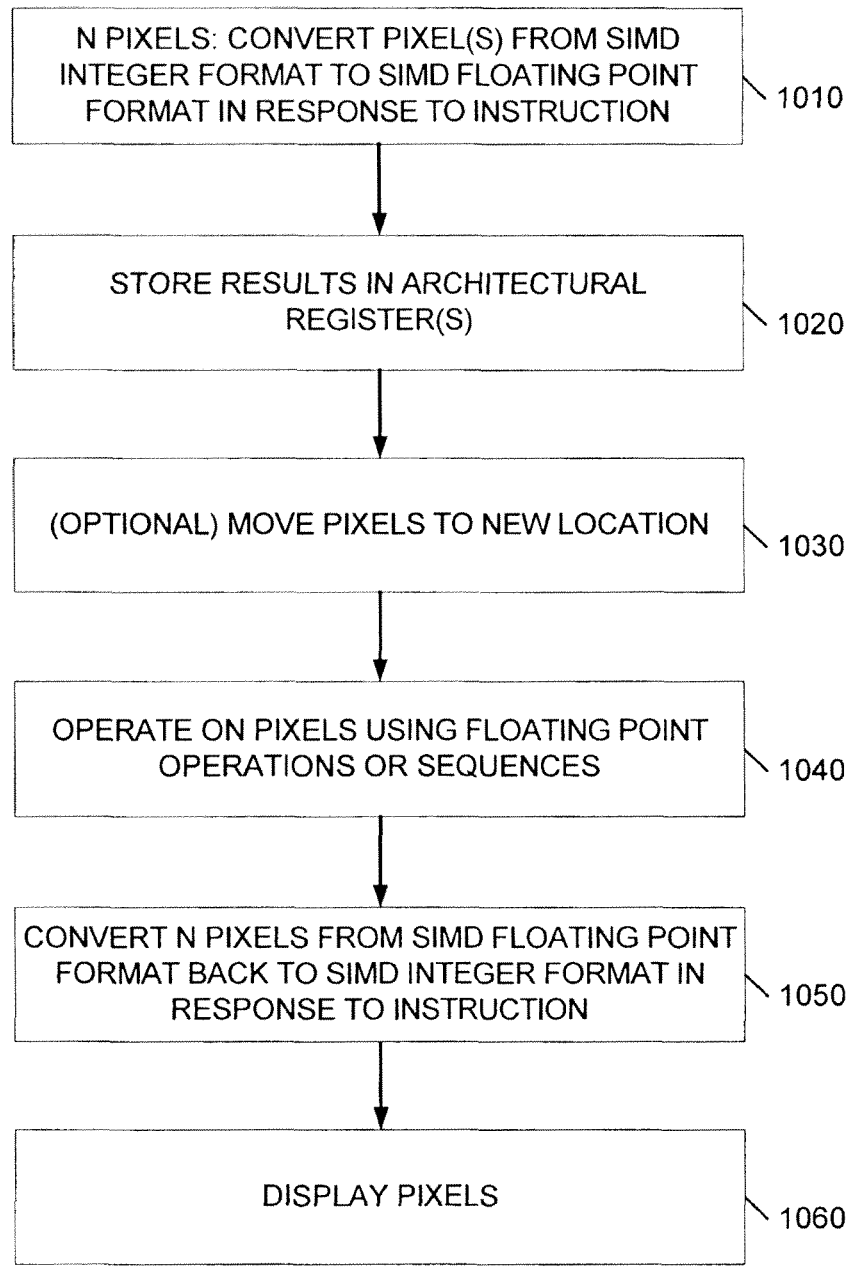
FIG. 10 illustrates a sequence utilizing various disclosed convert instructions according to one embodiment.

Further operations of the system of FIG. 9 may be appreciated with respect to the flow diagram of FIG. 10. As indicated in block 1010, a set of pixels (e.g., N pixels) are converted from SIMD integer format to SIMD floating point format. This conversion may be accomplished in the embodiment of FIG. 9 by the processor 900 executing the first convert sequence 995. The first convert sequence may include N convert instructions such as those of FIGS. 3*a*, 3*b* and 6 or may include a single convert instruction such as shown in FIG. 7*a* or 8*a*. The convert instruction(s) store the resulting converted values into architectural registers as indicated in block 1020. For example, four convert instructions may be used to convert four packed data elements in a single register in embodiments similar to the embodiment shown in FIGS. 3*a* and 3*b*.

In some cases, the converted values may be directly operated on in place after conversion. Optionally, the now converted pixel values in floating point format may be moved as indicated in block 1030. The pixels may be moved to other locations for manipulation or temporary storage prior to manipulation. Some of the destination values may be moved during the conversion process prior to execution of all N conversions to limit the number of registers used in the N pixel conversion process.

As indicated in block 1040, floating point operations may be performed on the pixel values. A great variety of different pixel manipulation techniques are known to those of skill in the art. An appropriate routine depends on the effect that is sought as will be apparent to those of skill in the art. However, the conversion process to and from floating point may be accomplished more efficiently using disclosed techniques.

Once the desired manipulations have been accomplished, then resulting floating point values may be converted back. As indicated in block 1050, the N pixels are converted from their SIMD floating point format back to SIMD integer format in response to one or more convert instructions. The second conversion routine 497, similarly to the first conversion routine, may accomplish this conversion back with a sequence of N instructions (e.g., embodiments of FIGS. 4*a*, 4*b*, 5) or with a single instruction (e.g., embodiments of FIGS. 7*b*, 8*b*).

Finally, the pixels may be displayed as indicated in block 1060. The display sequence 998 may include instructions to move the pixel data to the frame buffer 957 or may include other appropriate instructions to display a pixel for a particular system.

One example optimized instruction sequence using disclosed convert instructions is shown in Table 2, below. As can be readily appreciated from this example, the new convert instructions can lead to much shorter and in some case more rapidly executed code for some sequences.

TABLE 2

Example Instruction Sequence Improvement

| Old Sequence | New Sequence |
|---|---|
| \_asm { | \_asm { |
| pxor xmm0, xmm0 //ZEROI | // |
| movdqu xmm7, SRC | movdqu xmm7, SRC |
| movdqa xmm6, xmm7 | // |
| Punpcklbw xmm7, xmm0 //P | // |
| Punpckhbw xmm6, xmm0 //Q | // |
| movdqa xmm5, xmm7 | // |
| movdqa xmm4, xmm6 | // |
| Punpcklwd xmm7, xmm0 //P0 | // |
| Punpckhwd xmm5, xmm0 //P1 | // |
| Punpcklwd xmm6, xmm0 //P2 | // |
| Punpckhwd xmm4, xmm0 //P3 | // |
| cvtdq2ps xmm3, xmm7 //F0 | cvtb2ps xmm3, xmm7, 0 //F0 |
| cvtdq2ps xmm2, xmm5 //F1 | cvtb2ps xmm2, xmm5, 1 //F1 |
| cvtdq2ps xmm1, xmm6 //F2 | cvtb2ps xmm1, xmm7, 2 //F2 |
| movdqa F0, xmm3 | movdqa F0, xmm3 |
| movdqa F1, xmm2 | movdqa F1, xmm2 |
| cvtdq2ps xmm3, xmm4 //F3 | cvtb2ps xmm3, xmm7, 3 //F3 |
| movdqa F2, xmm1 | movdqa F2, xmm1 |
| movdqa F3, xmm3 | movdqa F3, xmm3 |
| } | } |

A processor design may go through various stages, from creation to simulation to fabrication. Data representing a design may represent the design in a number of manners. First, as is useful in simulations, the hardware may be represented using a hardware description language or another functional description language Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. An optical or electrical wave modulated or otherwise generated to transmit such information, a memory, or a magnetic or optical storage such as a disc may be the machine readable medium. Any of these mediums may "carry" or "indicate" the design or software information. When an electrical carrier wave indicating or carrying the code or design is transmitted, to the extent that copying, buffering, or re-transmission of the electrical signal is performed, a new copy is made. Thus, a communication provider or a network provider may make copies of an article (a carrier wave) embodying techniques of the present invention.

Thus, techniques for parallel data conversions are disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A reduced instruction set computer (RISC) processor comprising:
   a register file, within the RISC processor, including a first packed data register and a second packed data register;
   register rename logic within the RISC processor;
   a decoder, within the RISC processor, to decode instructions, the instructions to include a first instruction;
   schedule logic, within the RISC processor, to queue operations that correspond to the instructions for execution; and
   execution logic, within the RISC processor, coupled to the decoder, the register rename logic, and the schedule logic, the execution logic to perform out-of-order execution of at least some of the instructions;
   wherein, responsive to a decode of the first instruction by the decoder, the execution logic is to convert a first plurality of packed signed data elements to be stored in the first packed data register to a second plurality of packed unsigned data elements in the second packed data register, one or more of the second plurality of packed unsigned data elements to be saturated;
   the first plurality of packed signed data elements to include floating point data elements and the second plurality of packed unsigned data elements to include integer data elements;
   at least one of the packed signed data elements to have a first number of bits, at least one of the packed unsigned data elements to have a second number of bits, wherein the second number of bits is one half the first number of bits.

2. The processor of claim 1, wherein the first number of bits is 64 and the second number of bits is 32.

3. The processor of claim 1, wherein the one or more of the second plurality of packed unsigned data elements is to be saturated if a condition is satisfied.

* * * * *